United States Patent
Conete et al.

(10) Patent No.: US 11,519,361 B2
(45) Date of Patent: Dec. 6, 2022

(54) EXHAUST CONE WITH FLEXIBLE FITTING

(71) Applicant: SAFRAN CERAMICS, Le Haillan (FR)

(72) Inventors: Eric Conete, Moissy-Cramayel (FR); Benoit Carrere, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 17/267,361

(22) PCT Filed: Aug. 9, 2019

(86) PCT No.: PCT/FR2019/000127
§ 371 (c)(1),
(2) Date: Feb. 9, 2021

(87) PCT Pub. No.: WO2020/030858
PCT Pub. Date: Feb. 13, 2020

(65) Prior Publication Data
US 2021/0293201 A1 Sep. 23, 2021

(30) Foreign Application Priority Data
Aug. 10, 2018 (FR) .................................. 1857457

(51) Int. Cl.
*F02K 1/04* (2006.01)
*B64D 33/04* (2006.01)
(Continued)

(52) U.S. Cl.
CPC ............... *F02K 1/04* (2013.01); *B64D 33/04* (2013.01); *F02K 1/827* (2013.01); *B64D 27/16* (2013.01);
(Continued)

(58) Field of Classification Search
CPC .................................. F02K 1/04; B64D 33/04
See application file for complete search history.

(56) References Cited

U.S. PATENT DOCUMENTS 4,452,038 A * 6/1984 Soligny ..................... F02K 1/80
60/796
4,907,743 A 3/1990 Bouiller et al.
(Continued)

FOREIGN PATENT DOCUMENTS

EP 0316233 A1 6/1989

OTHER PUBLICATIONS

Corrected Version of International Search Report dated Nov. 4, 2020, issued in corresponding International Application No. PCT/FR2019/000127, filed Aug. 9, 2019, 2 pages.
(Continued)

*Primary Examiner* — Lorne E Meade
(74) *Attorney, Agent, or Firm* — Christensen O'Connor Johnson Kindness PLLC

(57) ABSTRACT

An assembly for an aircraft turbojet engine is described. The assembly includes a central gas-exhaust element and a connecting flange interposed between, upstream, a metallic outlet of a turbojet engine and, downstream, the central element. The connecting flange consists of an annular part and flexible lugs having axially: a first end where the lug is connected to the annular part, and a second free end, projecting radially outwards from the first end and towards which the lug is fixed with the central element.

9 Claims, 3 Drawing Sheets

(51) Int. Cl.
  *F02K 1/82* (2006.01)
  *B64D 27/16* (2006.01)
(52) U.S. Cl.
  CPC ...... *F05D 2230/64* (2013.01); *F05D 2260/96* (2013.01)

(56) References Cited

U.S. PATENT DOCUMENTS

| | | | | |
|---|---|---|---|---|
| 7,866,162 | B2* | 1/2011 | Blanchard | F02K 1/04 60/796 |
| 8,328,453 | B2* | 12/2012 | Keith | F01D 25/243 403/30 |
| 8,424,312 | B2* | 4/2013 | Conete | F02K 1/52 60/796 |
| 8,590,316 | B2* | 11/2013 | Conete | F02K 1/48 60/770 |
| 8,726,675 | B2* | 5/2014 | Keith | F01D 25/243 60/799 |
| 8,919,136 | B2* | 12/2014 | Conete | F02K 1/04 60/799 |
| 9,784,215 | B2* | 10/2017 | Lu | F02K 1/04 |
| 10,100,664 | B2* | 10/2018 | Renggli | F01D 25/005 |
| 2011/0203255 | A1 | 8/2011 | Conete | |
| 2012/0160933 | A1* | 6/2012 | Vauchel | F02K 1/827 239/265.11 |
| 2014/0158458 | A1 | 6/2014 | Malot et al. | |

OTHER PUBLICATIONS

Written Opinion of the International Searching Authority dated Nov. 4, 2020, issued in corresponding International Application No. PCT/FR2019/000127, filed Aug. 9, 2019, 5 pages.

International Preliminary Report on Patentability dated Feb. 16, 2021, issued in corresponding International Application No. PCT/FR2019/000127, filed Aug. 9, 2019, 1 page.

International Search Report dated Nov. 4, 2020, issued in corresponding International Application No. PCT/FR2019/000127, filed Aug. 9, 2019, 2 pages.

* cited by examiner

EXHAUST CONE WITH FLEXIBLE FITTING

FIELD OF THE INVENTION

This invention relates to an assembly located at the rear (downstream end) of an aircraft turbojet engine to optimize the flow of hot gases expelled by the turbojet engine, and possibly absorbing at least part of the noise generated by [the interaction of these hot gases, coming from the internal engine parts (combustion chamber, turbine(s)), with the ambient air and with the flow of cold air expelled by the turbojet engine fan]

Specifically, the invention relates to the connection between what is often referred to as an "exhaust cone" and, located just upstream, a gas outlet of the turbojet engine.

Typically the exhaust cone is completed (surrounded) by a part called "primary nozzle"; these elements are commonly referred to as "plug" or "tail cone" for the exhaust cone and "nozzle", and as "primary nozzle" for the nozzle.

The "exhaust cone" is intended to be positioned downstream turbine (part) of the turbojet engine, around which the primary nozzle is concentrically placed. Both the exhaust cone and the primary nozzle are attached to a turbojet engine casing by a flanged fastening system.

An aircraft turbojet engine assembly is thus already known per se, comprising:
a central gas-exhaust element (which means: central element for exhausting gas), annular about an axis (X) and adapted for gas to be ejected by the turbojet engine around it, from upstream to downstream, and
a connecting flange interposed between, upstream, one said metallic outlet of a turbojet engine and, downstream, the central element, to connect them together.

The above-mentioned X-axis is the longitudinal axis, or axis of rotation, of the turbomachine (in particular of the following fan 20 and moving blades of the engine 12). In this context, 'axial' means the direction along (or parallel to) the X-axis; 'radial' means radially with respect to the X-axis and 'circumferential' means around the X-axis.

The central gas-exhaust element may correspond to the above-mentioned exhaust cone (marked 1 below), or at least to the upstream part 1a below.

A conventional exhaust cone 1 is shown in FIG. 1, in which the upstream (AM) and downstream (AV) of the structure along a engine axis (X axis above) are located respectively to the left and to the right of the figure.

More generally, illustrated in FIG. 1, is an aircraft gas turbojet engine 10 whose centre section, forming the gas turbine engine(s) 12, is mounted inside an engine nacelle assembly 14, as is typical of an aircraft designed for subsonic operation. The nacelle assembly 14 generally consists of a nacelle engine, known as a core 16 and a fan nacelle 180 surrounding a fan 20 located axially upstream of (or from) the engine 12.

Axially downstream, the engine 12 comprises at least one turbine (which may be a low-pressure turbine) and, further downstream, an exhaust casing 22 comprising an inner annular shell 22a and an outer annular shell 22b delimiting between them a downstream part of the primary vein 24 in which the combustion gases from the combustion chamber of the engine 12 circulate.

Axially, the inner annular shell 22a is connected to the exhaust cone 1, which may comprise an upstream portion 1a (commonly referred to as the front plug), which is substantially cylindrical in shape, and a downstream portion 1b (commonly referred to as the rear plug), which is conical in shape.

Connecting (joining) together the aforesaid metallic outlet of the turbojet engine, which may be said inner annular shell 22a, and said central element, which may be said upstream part 1a of the exhaust cone 1, is difficult. In fact, as shown in FIG. 2, it can be difficult to fix together axially, at the level of a bulb 7, the aforementioned metallic outlet of the turbojet engine, which can be the said internal annular shell 22a and the central element (generally identified as 3) which, in the example of implementation of the following invention, will be assimilated to the exhaust cone 1, the bulb 7 being a zone, swollen radially outwards, which the central element 3 can be present.

In particular, problems can arise in this regard:
to manage the inlet diameter of the central element for the passage of flexible supports,
complicated connection,
and inclined connections (not parallel to the X-axis) in the bulb.

A proposed solution to at least some of these problems is that the connecting flange include:
an annular part, and,
circumferentially, flexible lugs having individually, axially:
a first end at which the lug is connected to said annular part, and
a second free end to which said lug is attached with the central element.

This makes it possible, in particular, to absorb differential expansions between the said central element and the said annular part which may respectively belong to, or define, the metallic exhaust casing and the non-metallic exhaust cone.

In this regard, it is further proposed that the flexible lugs extend radially outwards from the first end and/or from openings formed in the annular part.

This allows the mounting areas to be radially offset and combines flexibility and ease of installation In addition, and in particular in this case, two possibilities have been more precisely defined:
firstly, it is proposed that one said lug could be connected to said annular part, at one said first end, by means of tabs extending downstream and which would be integral upstream with said annular part;
then, alternatively, it is proposed that one said lug could be connected in one piece to said annular portion, at the location of a portion of said annular portion forming a downstream edge of one said opening.

In the second case, by cutting locally, at the location of a rectangular area for example, the annular part on three sides and bending the cut part to form a so-called flexible lug, we avoid adding weight and make it easy both to manufacture and to achieve the desired flexible fixation.

In the first case, if such tabs are provided, integrated in a crenellated shape of the said annular part, the weight will also be limited, having in fact lightened this annular part in another way.

In this text, the word 'connected' means either 'held in place by mechanical means' (e.g. screwed, welded) or it means 'part of'. If doing so creates a one-piece connection, this is specified.

Preferably, said annular part will be coaxial with said central element.

Preferably, the second free end of each said lug shall be located axially upstream of (or from) the first end of that lug. This may be important.

Indeed, by ensuring flexibility from downstream to upstream in the fixings via the said flexible lugs, it will be possible to bring the attachment of the central element/exhaust cone closer upstream (i.e., towards the connecting flange), thus favouring an attachment zone located axially outside one said bulb and an acoustic treatment zone which could be provided.

In this respect, it is also proposed that said central element have a peripheral wall having an upstream end portion where the central element will be fixed with said flexible lugs at their said second free ends.

In particular, said peripheral wall could usefully:
be provided locally with a sound-attenuating structure (which may be honeycombed), and
present its said upstream (attachment) end portion upstream of (or from) the sound-attenuation structure.

It may even be possible for the sound-attenuating structure to extend axially to the right of (which means: just around, at the same axial level than) the said lugs.

Thus, it was possible to fix the said central element, including a central element made of CMC (ceramic matrix composite, known per se), without impacting the acoustic treatment and without being located in the bulbous aerodynamic profile. The connecting flange can then be made of metal without difficulty. And, all the more so, this will maximise the acoustically treated surface of the central element.

The above should preferably be done:
with one said upstream end portion for fixing the central element extending parallel to the said axis (X) (thus avoiding the above-mentioned inclined connections),
likewise for said lugs towards their said second ends, so that these lugs and said upstream end portion of the central element/exhaust cone are attached together by screws passing through them.

It may also be useful to provide for the above-mentioned peripheral wall to extend:
axially upstream, and
radially outwardly with respect to said upstream end portion which it covers except at radial passage locations for said screws.

With said flexible lugs ensuring flexibility from downstream to upstream in the attachments, we will be able:
to become more compact,
thus limiting the mass of the solution compared to other flexible media,
integrate, including with metallic connecting flanges, central element architectures/exhaust cones (CMC or metallic) provided with acoustic treatments in relation to a gas vein (see primary vein 24 above) equipped with upstream and downstream stiffeners.

The invention will be better understood, if need be, and other details, characteristics and advantages of the invention will appear upon reading the following description given by way of a non restrictive example while referring to the appended drawings wherein:

DETAILED DESCRIPTION

Figure 1:
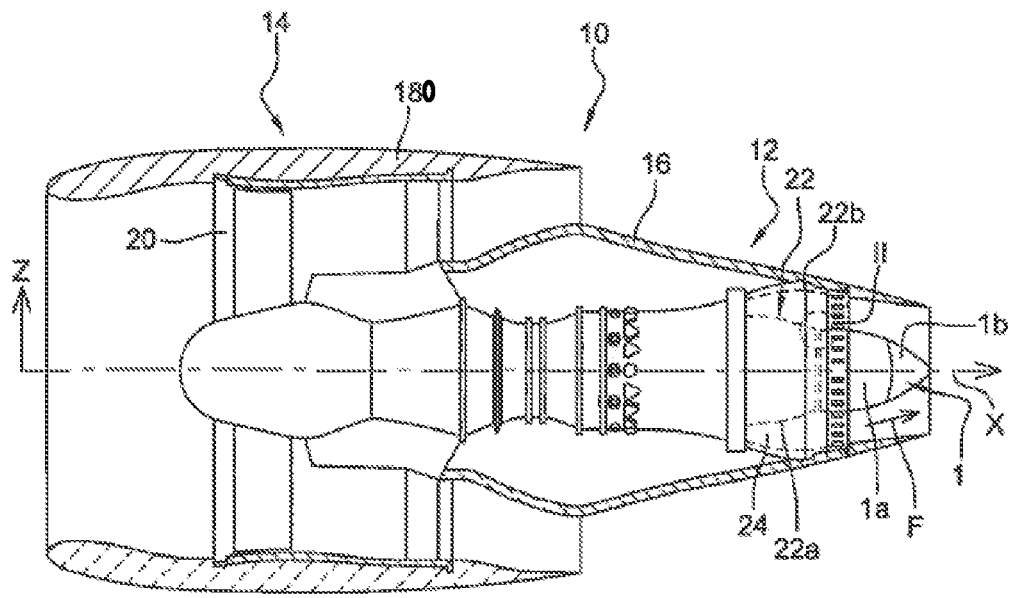
FIG. 1 is a schematic view of a turbine engine according to the invention.
Figure 2:
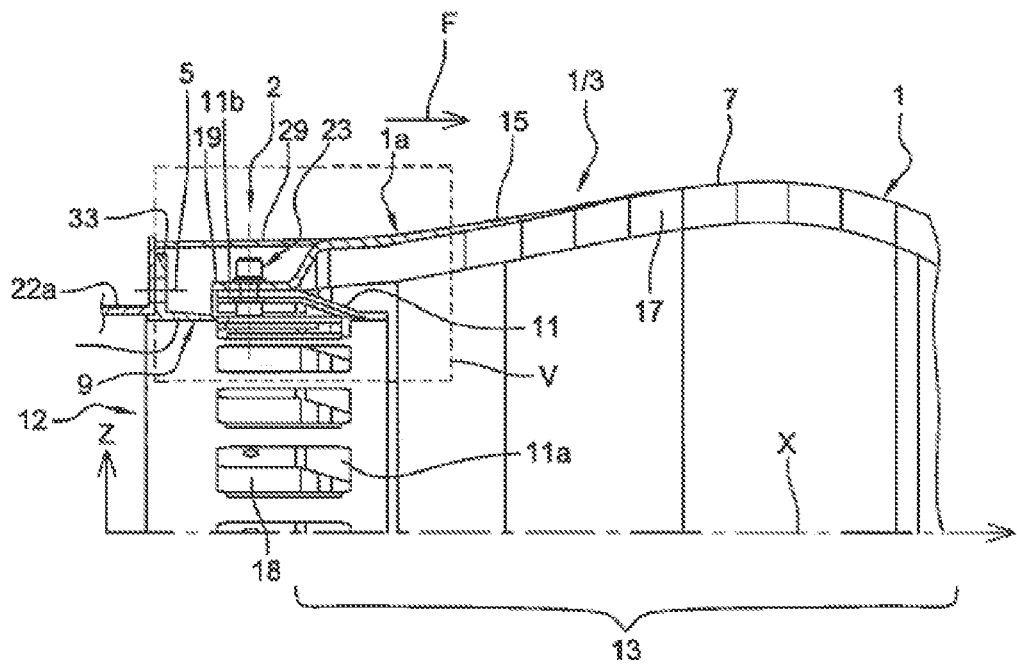
FIG. 2 corresponds to the local view in frame II of FIG. 1, in a version conforming to the invention.

In FIG. 2, we find, by reference with FIG. 1 and therefore on a turbojet engine 10, a tail unit 2 of engine 12, comprising a central gas-exhaust element 1 (or exhaust cone) and a connecting flange 9 interposed between, upstream, a metallic outlet of a turbojet engine (here the internal annular shell 22a of the exhaust casing) and, downstream, the said central element 1, to connect them together via the axial fasteners 5. The central element 1 is made of ceramic matrix composite and is annular around the (X) axis. It is adapted to have gas ejected by the turbojet engine around it, from upstream to downstream; see arrow F FIGS. 1,2.

Figure 3:
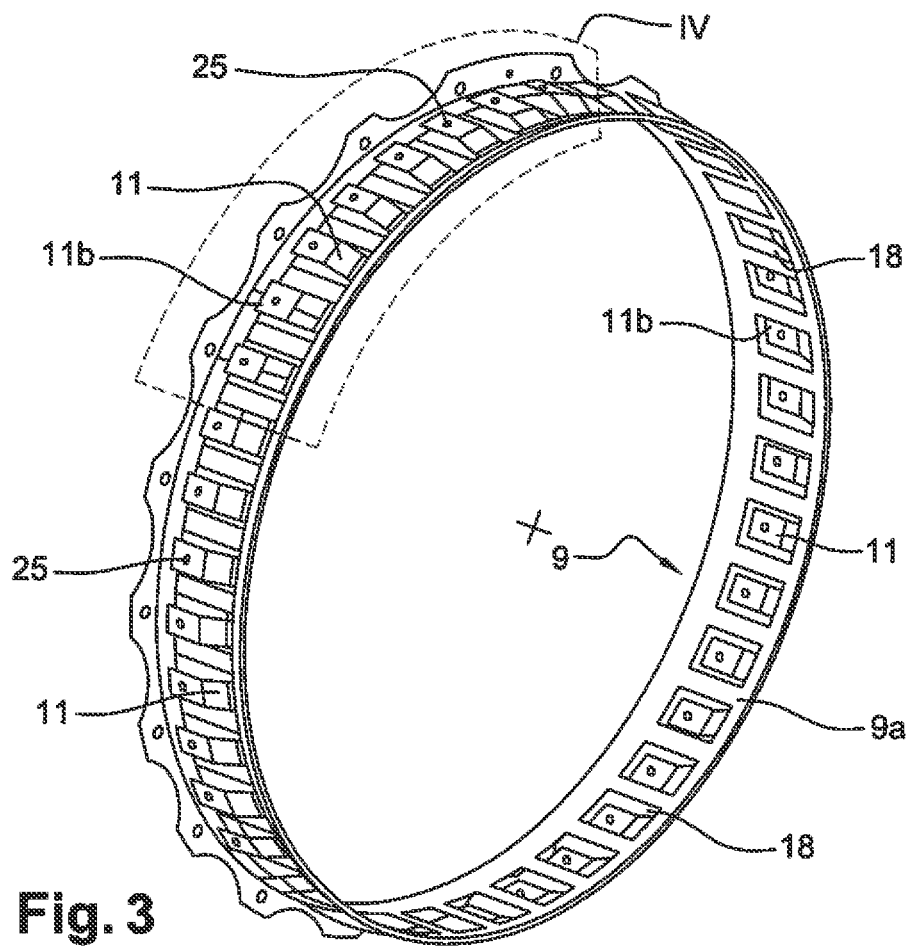
FIG. 3 is a perspective view of the connecting flange (9 below) according to a first embodiment.

In accordance with the invention and as shown in FIGS. 2, and 3, the connecting flange 9 comprises an annular part 9a, coaxial with the central element 1 and, circumferentially, flexible lugs 11.

The flexible lugs 11 follow one another circumferentially, in a regular sequence around the X axis, on the annular part 9a. Lugs 11 are presented as blades that can be roughly rectangular. They are flexible in relation to the annular part 9a and are individually and axially:
a first end 11a at (the location of) which the lug is integrally connected to said annular part 9a, and
a second free end 11b, projecting radially (Z-axis) outwards from the first end 11a and to which the lug 11 is fixed with the central element 1.

Each can therefore bend at the first end 11a. They define as many flexible supports.

The central element/exhaust cone 1, hereinafter referred to systematically as the 'central element', is made of ceramic matrix composite and the connecting flange 9 is metallic. It can be titanium alloy or any other high temperature resistant alloy.

In particular so as not to fix the lugs 11 to the central element 1 in a zone treated for acoustic attenuation (see details below; zone 13) nor in the bulb 7, the second free end 11b of one said flexible lug 11 (of each), where there is fixing with the central element 1, is located axially upstream (AM) of the first end 11a of this lug; see in particular FIG. 5.

In particular in this case, the central element 1 may have a peripheral wall 15:
locally provided with a sound-attenuating honeycomb core structure 17, and
having, upstream of the sound-attenuating structure 17, an upstream end portion 19 where the central element 1 is fixed with said flexible lugs 11, at their second free ends 11b.

Thus, the sound-attenuating structure 17 will be well confined downstream of the part 19 through which the fixing with the lugs 11 will take place.

To make the attachment more reliable, the upstream end part 19 will form a circumferentially closed ring which extends the peripheral wall 15 in one piece upstream from the sound-attenuating structure 17 as an axial. This annular flange 19 has holes 21 through which fixing screws 23 pass, which also pass through other holes 25 in the flexible lugs 11 towards their second free ends 11b respectively.

Figure 4:
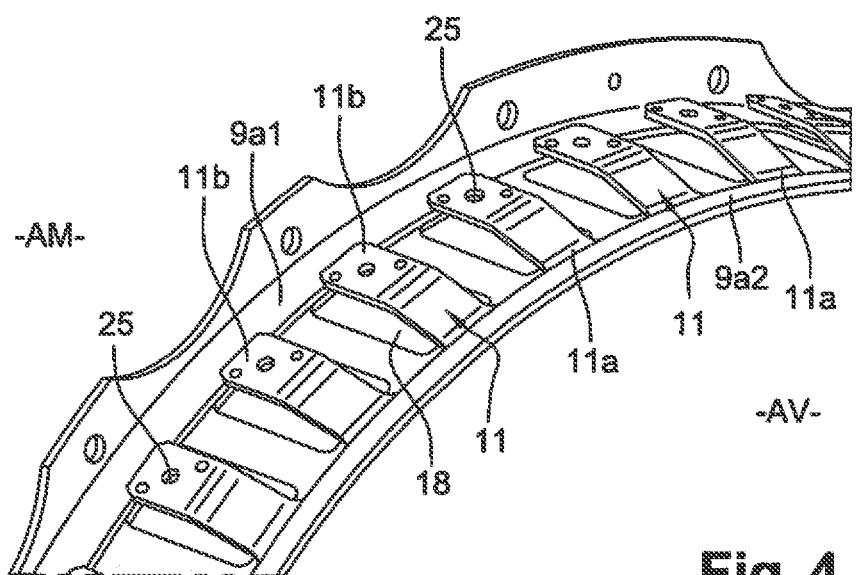
FIG. 4 is an enlarged detail of the area marked IV in FIG. 3.
Figure 5:
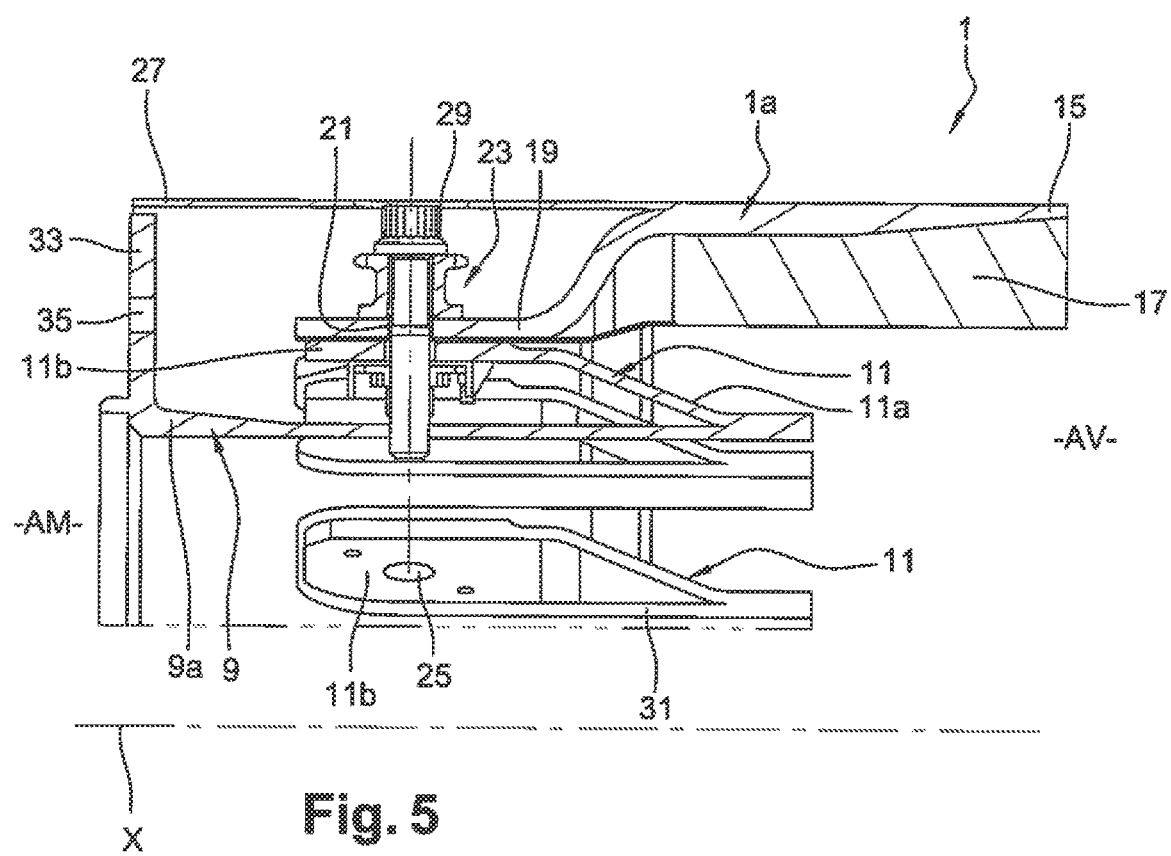
FIG. 5 is an enlargement of the area marked V in FIG. 2, according to a second embodiment.
Figure 6:
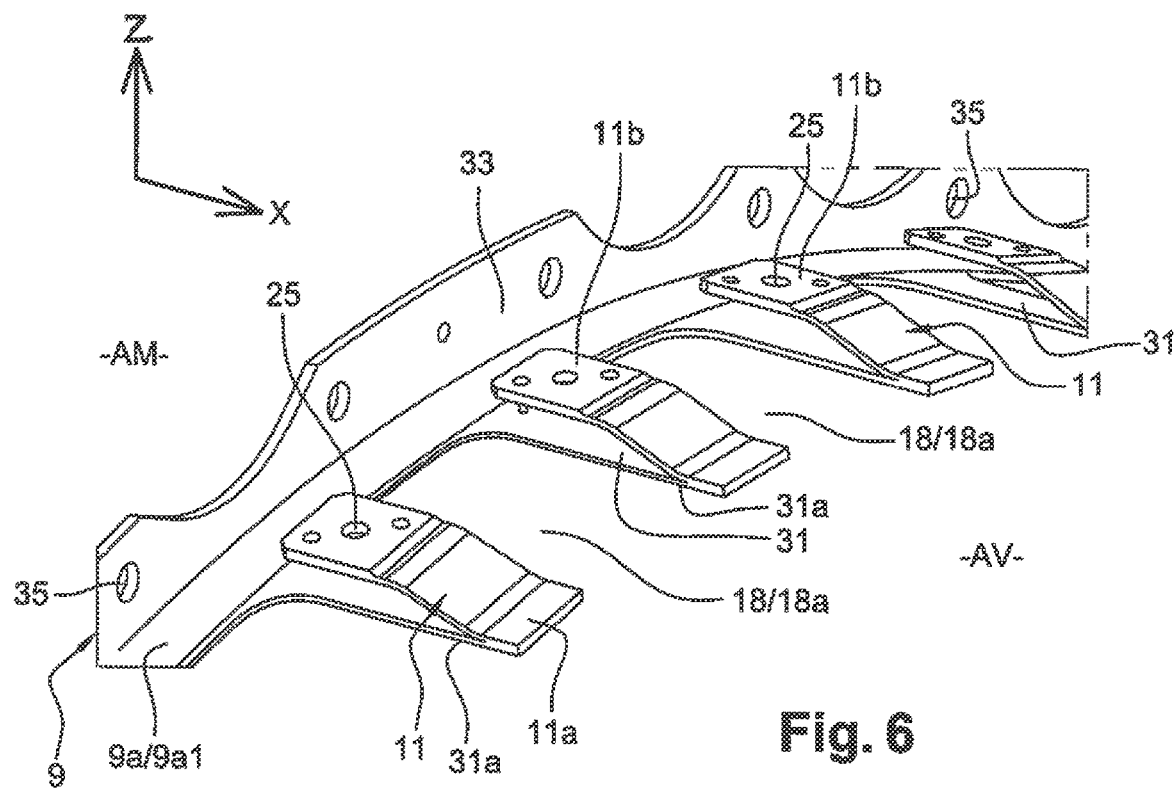
FIG. 6 is the same view as FIG. 4, but using the second embodiment.

In addition, in order to allow for a large radial clearance and the installation of fasteners (such as screws 23; see FIGS. 2, 5), it may be preferable for the flexible lugs 11 to extend radially from openings, in this case cut-outs 18, formed in the annular part 9; see FIGS. 3, 4, 6.

In practice, the central element 1 may be expected to comprise, as shown in reference to FIG. 1, an upstream part 1a (commonly referred to as a "front plug"), of substantially cylindrical shape and, axially fixed to it (e.g. by bolting), a downstream part 1b (commonly referred to as a "rear plug"), of conical shape. It would then be this upstream part 1a which would be equipped with at least one so-called sound-attenuating structure 17, and thus with wall 15 and part 19.

With an orientation of the upstream end part 19 extending parallel to the said X-axis, likewise for the lugs 11 towards their second ends 11b, the upstream part 1a of the central element 1 and the connecting flange 9 can be fixed together parallel to the X-axis, thus avoiding oblique stresses.

Screws 23 radially passing through coaxial holes 21 25 radially will then be able to ensure a reliable and effective attachment without excessive stress.

In particular for the installation and/or maintenance of these screws, it is also proposed that the peripheral wall 15 be extended by a wall section 27:
axially upstream,
and radially outwardly with respect to the said upstream end portion 19 which this wall section 27 will then cover, except at places of radial passages 29 for the screws 23; see FIGS. 2 and 5.

It should also be noted in FIGS. 2 and 5 that, by means of the said lugs 11 thus ensuring flexibility from downstream to upstream in the fasteners, the sound-attenuating structure 17 can extend axially, at the upstream end, to the right of the lugs 11.

FIG. 6 shows an alternative to the solution in FIGS. 2,5. In fact, the annular part 9a, coaxial with the central element 1, is no longer located circumferentially upstream and downstream of lugs 11 (parts 9a1 and 9a2b, FIG. 4), but only upstream of these lugs: part 9a1, FIG. 6. From the annular part 9a1, axial tabs 31 extend axially between which are reserved said openings 18, here in the form of sectorized slots 18a each. The solution in FIG. 5 is also as follows. The connection to the annular part 9a is then made via tabs 31. And it is to the downstream free end 31a (see FIG. 6) of each tab 31 that the said first end 11a is connected (e.g. welded). The second free end 11b, still projecting radially (Z-axis) outwards from the first end 11a and towards which the lug 11 is fixed with the central element 1, is still located upwards from said first end 11a. In this case the lugs 11 are located circumferentially between two successive openings 18 and radially opposite the respective tabs 31.

FIGS. 4 and 6 show the radial flange through axial holes 35 of which axial fasteners 5 (see FIG. 2), such as screws, allow the connecting flange 9 to be fixed to the said metallic outlet of the turbojet engine, here the internal annular ring shell 22a of the exhaust casing 22.

The invention claimed is:

1. An assembly for an aircraft turbojet engine, the assembly comprising:
a central element for exhausting gas, which is annular about an axis and is configured to have gas exhausted by the turbojet engine around it, from upstream to downstream; and
a connecting flange interposed between, upstream, a metallic outlet of the turbojet engine and, downstream, the central element, to join the metallic outlet and the central element together,
wherein the connecting flange comprises an annular portion and flexible lugs arranged circumferentially around the axis, each flexible lug extending parallel with the axis and having axially:
a first end where the lug is connected to said annular portion, and
a second free end towards which said lug is fixed with the central element, the second free end being located axially upstream of the first end,
wherein the central element has a peripheral wall having an upstream end portion, the upstream end portion being fixed with said respective second free ends of said flexible lugs, and
wherein the upstream end portion of the central element extends parallel to said axis, towards said respective second ends of said flexible lugs, so as to be joined together by screws passing therethrough, and
wherein the peripheral wall extends axially upstream, and radially outwardly with respect to said upstream end portion, to cover the upstream end portion except at locations of radial passages for the screws.

2. The assembly according to claim 1, wherein the flexible lugs extend radially outwardly from the first end or from openings of the connecting flange.

3. The assembly according to claim 2, wherein one of said plurality of lugs is integrally connected to said annular portion at a part of said annular portion forming a downstream edge of one said opening.

4. The assembly according to claim 1, wherein the peripheral wall is locally provided with a sound-attenuating structure and the upstream end portion is located upstream of the sound-attenuating structure.

5. The assembly according to claim 4, wherein the sound-attenuating structure extends axially to the right of said lugs.

6. The assembly according to claim 4, wherein the sound-attenuating structure is honeycombed.

7. The assembly according to claim 1, wherein the central element is made of a ceramic matrix composite material and the connecting flange is metallic.

8. An assembly for an aircraft turbojet engine, the assembly comprising:
a central element for exhausting gas, which is annular about an axis and is configured to have gas exhausted by the turbojet engine around it, from upstream to downstream; and
a connecting flange interposed between, upstream, a metallic outlet of the turbojet engine and, downstream, the central element, to join the metallic outlet and the central element together,
wherein the connecting flange comprises an annular portion and, circumferentially around the axis, a plurality of tabs and a plurality of flexible lugs,
wherein the annular portion extends upstream from the plurality of tabs and the plurality of flexible lugs, wherein the tabs of the plurality of tabs are integral upstream with said annular portion,
wherein the flexible lugs of the plurality of flexible lugs respectively extend radially outwardly from the tabs of the plurality of tabs, and
wherein each flexible lug of the plurality of flexible lugs has, axially:
a first end where the flexible lugs are individually connected to respective tabs of the plurality of tabs, and
a second free end towards which said lug is fixed with the central element, the second free end being located axially upstream of the first end,
so that the plurality of flexible lungs are connected to said annular portion by said connections at the respective first ends and by the respective tabs which are integral upstream with said annular portion.

9. An assembly for an aircraft turbojet engine, the assembly comprising:
- a central element for exhausting gas, which is annular about an axis and is configured to have gas exhausted by the turbojet engine around it, from upstream to downstream; and
- a connecting flange interposed between, upstream, a metallic outlet of a turbojet engine and, downstream, the central element, to join the metallic outlet and the central element together,
- wherein the connecting flange comprises an annular portion and, circumferentially around the axis, a plurality of flexible lugs and a plurality of openings passing through the connecting flange,
- wherein the annular portion has a first annular portion at a first axial end and a second annular portion at a second axial end located downstream the first annular portion, each opening of the plurality of openings extending between the first annular portion and the second annular portion,
- wherein the plurality of flexible lugs each have, axially:
  - a first end where the flexible lug is connected to said second annular portion, and
  - a second free end located axially upstream of the first end, and
- wherein each lug of the plurality of flexible lugs extends radially outwardly from the first end and from the corresponding opening, so that each opening is radially interposed between the axis and one lug of the plurality of flexible lugs.

* * * * *